(No Model.)

E. P. GLEASON.
GAS TEST GAGE.

No. 341,841. Patented May 11, 1886.

WITNESSES:
W. C. Gleason
Norman Farquhar

Elliott P. Gleason INVENTOR

BY

E. F. Gennert. his ATTORNEY

N. PETERS. Photo-Lithographer. Washington. D. C.

UNITED STATES PATENT OFFICE.

ELLIOTT P. GLEASON, OF BROOKLYN, NEW YORK.

GAS-TEST GAGE.

SPECIFICATION forming part of Letters Patent No. 341,841, dated May 11, 1886.

Application filed February 8, 1886. Serial No. 191,155. (No model.)

*To all whom it may concern:*

Be it known that I, ELLIOTT P. GLEASON, a citizen of the United States, and a resident of Brooklyn, county of Kings, and State of New York, have invented a new and useful Improvement in Gas-Test Gages or Meters, of which the following is a specification.

My improvement consists in providing a scale and indicator, and inclosing the gage with suitable caps to prevent dust getting into it when it is not in use, also to make it convenient to carry in one's pocket.

Figure 1:
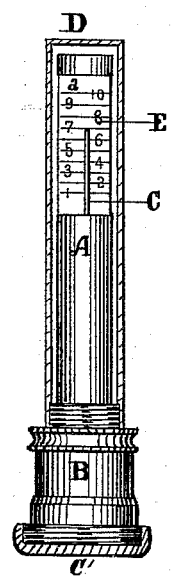
Figure 2:
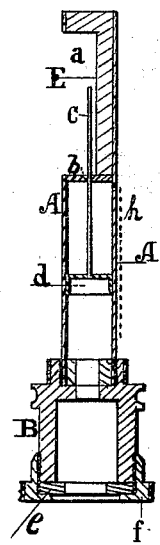

In the accompanying drawings, which form part of this specification, Figure 1 is a full face view of the gage with the inclosing-caps shown in central section. Fig. 2 is a transverse sectional view of the gage alone.

Similar letters of reference refer to similar parts in the two views.

A represents a thin tube of metal, in the upper end of which a large notch is made from the face side, as shown at $a$. The tube A is inclosed at the bottom of this notch by a disk, $b$, which is perforated in its center, so as to permit the free longitudinal movement of the indicator C, which passes through it. This indicator is firmly attached to and extends from an inverted cup, $d$, which is made very light and to fit closely, yet move freely, on the inside of the tube A.

The tube A is firmly attached to a base, B, of convenient form to slip over the tip of a gas-burner. On its bottom end an elastic washer, $e$, is held by means of a perforated screw-cap, $f$, which is threaded on its periphery to receive the covering-cap C'. At the upper end of the base B is a screw-thread to receive covering-cap D. A scale, E, of any suitable material, made to correspond with the shape of the notched end of the tube A, is inserted therein.

The tube A has a fine slot or a line of small holes (indicated by the dotted line $h$ at A) extending from near the base B longitudinally upward to the disk $b$. This slot or line of holes is made in the side of the tube behind the face of the scale E, so that gas passing through when the gage is being used is blown away from the face of the inspector, and not against it into his mouth and nostrils, as is the case when using the gage patented by D. M. Small August 28, 1877, No. 194,737.

The operation of my gage is as follows: The base B is slipped over the gas-tip to be inspected until the elastic washer is so seated around it as to make a tight joint, so that all the gas will have to pass through the tube A and slot or line of holes $h$. The gas is then turned on without being lighted, when the flow or pressure will carry the cup $d$ up on the tube A until the flow of gas finds free escape through the slot or line of holes $h$. The indicator C will be carried up with the cup $d$, and by observing the markings of the scale reached by its point the inspector ascertains the number of feet of gas passing per hour.

Having fully described my invention, what I claim as new, and desire to secure by Letters Patent of the United States, is—

1. In a gas-test gage, the notched tube A, adapted to receive the scale E, in combination with said scale, and an inverted cup, $d$, carrying an indicator and adapted to move longitudinally within said tube, in the manner and for the purpose specified.

2. In a gas-test gage, the cup $d$, indicator C, and scale E, in combination with a tube, as A, having a slot or line of holes on the side behind the face of the scale, in the manner and for the purpose specified.

3. A gas-test gage consisting of a tube, A, scale E, indicator C, cup $d$, and base B, in combination with the covering-caps C' and D, substantially as and for the purpose specified.

In testimony that I claim the foregoing as my invention I have signed my name, in presence of two witnesses, this 3d day of February, 1886.

ELLIOTT P. GLEASON.

Witnesses:
 R. S. HAYWARD,
 W. C. GLEASON.